United States Patent [19]

Yamada et al.

[11] Patent Number: 5,028,028
[45] Date of Patent: Jul. 2, 1991

[54] SEAT SLIDING DEVICE

[75] Inventors: Yukifumi Yamada; Takami Terada, both of Toyota; Keiichi Hibino, Okazaki, all of Japan

[73] Assignee: Aisin Seiki Kabushiki Kaisha, Kariya, Japan

[21] Appl. No.: 514,956

[22] Filed: Apr. 26, 1990

[30] Foreign Application Priority Data

Apr. 28, 1989 [JP] Japan ................................... 1-50875

[51] Int. Cl.⁵ ........................................... F16M 13/00
[52] U.S. Cl. ................................... 248/430; 297/344
[58] Field of Search ............... 248/429, 430, 419, 424, 248/420; 296/65.1; 312/331; 384/50, 47; 297/346, 322, 344, 329, 473, 468

[56] References Cited

U.S. PATENT DOCUMENTS

| | | | |
|---|---|---|---|
| 4,621,784 | 11/1986 | Kaesling | 297/344 X |
| 4,629,254 | 12/1986 | Stolper | 297/468 |
| 4,720,073 | 1/1988 | Mann | 248/419 X |
| 4,725,032 | 2/1988 | Kazaoka | 384/50 X |
| 4,811,925 | 3/1989 | Fujita | 296/65.1 X |
| 4,821,991 | 4/1989 | Aihara | 296/65.1 X |
| 4,863,289 | 9/1989 | Lecerf | 384/47 |
| 4,892,282 | 1/1990 | Suzuki et al. | |
| 4,940,285 | 7/1990 | Suzuki | 297/473 |
| 4,941,637 | 7/1990 | Pipon | 296/65.1 X |

FOREIGN PATENT DOCUMENTS 3724758 2/1989 Fed. Rep. of Germany ...... 248/430
62-238136 10/1987 Japan .

Primary Examiner—J. Franklin Foss
Attorney, Agent, or Firm—Finnegan, Henderson, Farabow, Garrett & Dunner

[57] ABSTRACT

In a seat sliding device, an upper rail slidably moveable relative a lower rail interlocks with the lower rail upon movement of the upper rail away from the lower rail. An upwardly inclined portion and a downwardly inclined portion can be provided on the upper rail and the lower rails, respectively. A spacer element is provided between the upwardly inclined portion of the upper rail and a corner of the lower rail. The inclined portions and the spacer elements interlock upon movement of the upper rail away from the lower rail. Due to sufficient area being provided between the interlocking portions, separation of the upper rail from the lower rail can be prevented.

8 Claims, 4 Drawing Sheets

SEAT SLIDING DEVICE

BACKGROUND OF THE INVENTION

1. Field of the Invention

The present invention relates to a seat sliding device and in particular to a seat sliding device for use in a motor vehicle.

2. Description of the Related Art

In general, a conventional seat sliding device, as disclosed in Japanese Patent Laid-open Publication No. 62-238136, includes a pair of laterally spaced lower rails both of which are secured to a floor of a vehicle body and a pair of upper rails slidably mounted on the corresponding lower rails. During vehicle collision, a large upward force is applied to the upper rail. In order to prevent separation of each upper rail from the lower rail upon application of such a force, a bent portion is formed on each rail. The bent portions of opposing upper and lower rails are interlocked with each other, thereby preventing separation of the upper rail from the lower rail.

However, if the opposing portions of the upper and lower rail forming the interlocking portion have an insufficient area, the interlocking function may still fail when an unexpected large force is applied to the upper rail, thereby separating the upper rail from the lower rail.

SUMMARY OF THE INVENTION

It is an object of the present invention to provide a seat sliding device without the aforementioned drawback.

It is another object of the present invention to provide a seat sliding device in which an interlocking portion of sufficient area can be provided between an upper rail and a lower rail, thereby performing an effective interlocking operation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

In order to accomplish the above objects, a seat sliding device is provided including an upper rail movable along a lower rail, the upper rail being interlocked with the lower rail upon upward movement of the upper rail, the seat sliding device including an upwardly inclined portion provided with the upper rail, and a downwardly inclined portion provided with the lower rail disposed t be interlocked with the upwardly inclined portion upon upward movement of the upper rail.

BRIEF DESCRIPTION OF THE DRAWINGS

The accompanying drawings, which are incorporated in and constitute a part of the specification, illustrate a preferred embodiment of the invention. Together with the general description given above and the detailed description of the preferred embodiment below, they serve to explain the principles of the invention.

DETAILED DESCRIPTION OF THE PREFERRED EMBODIMENT

Reference will now be made in detail to the present preferred embodiment of the invention as illustrated in the accompanying drawings.

Figure 1:
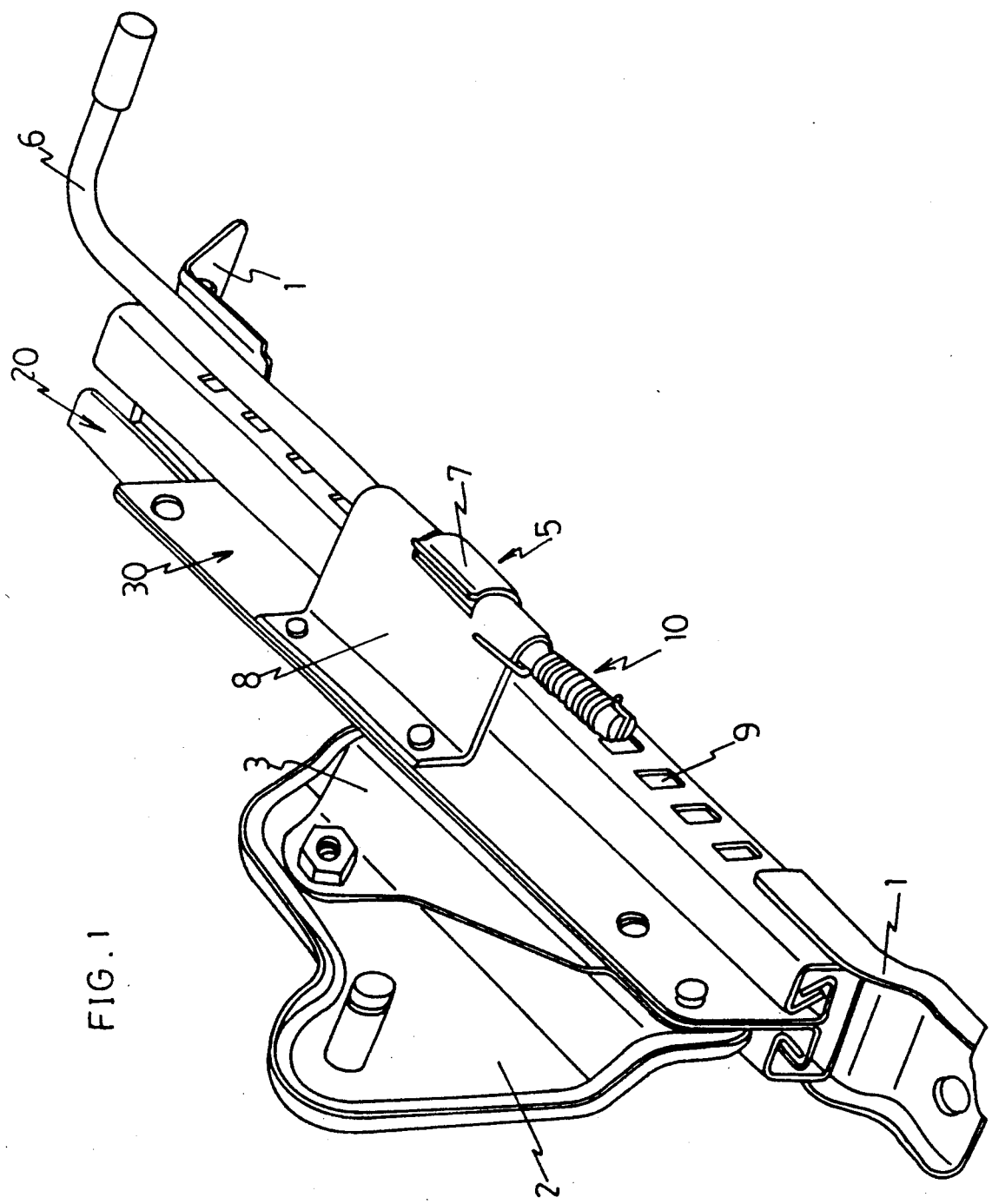
FIG. 1 is a perspective view of a seat sliding device according to the present invention.
Figure 2:
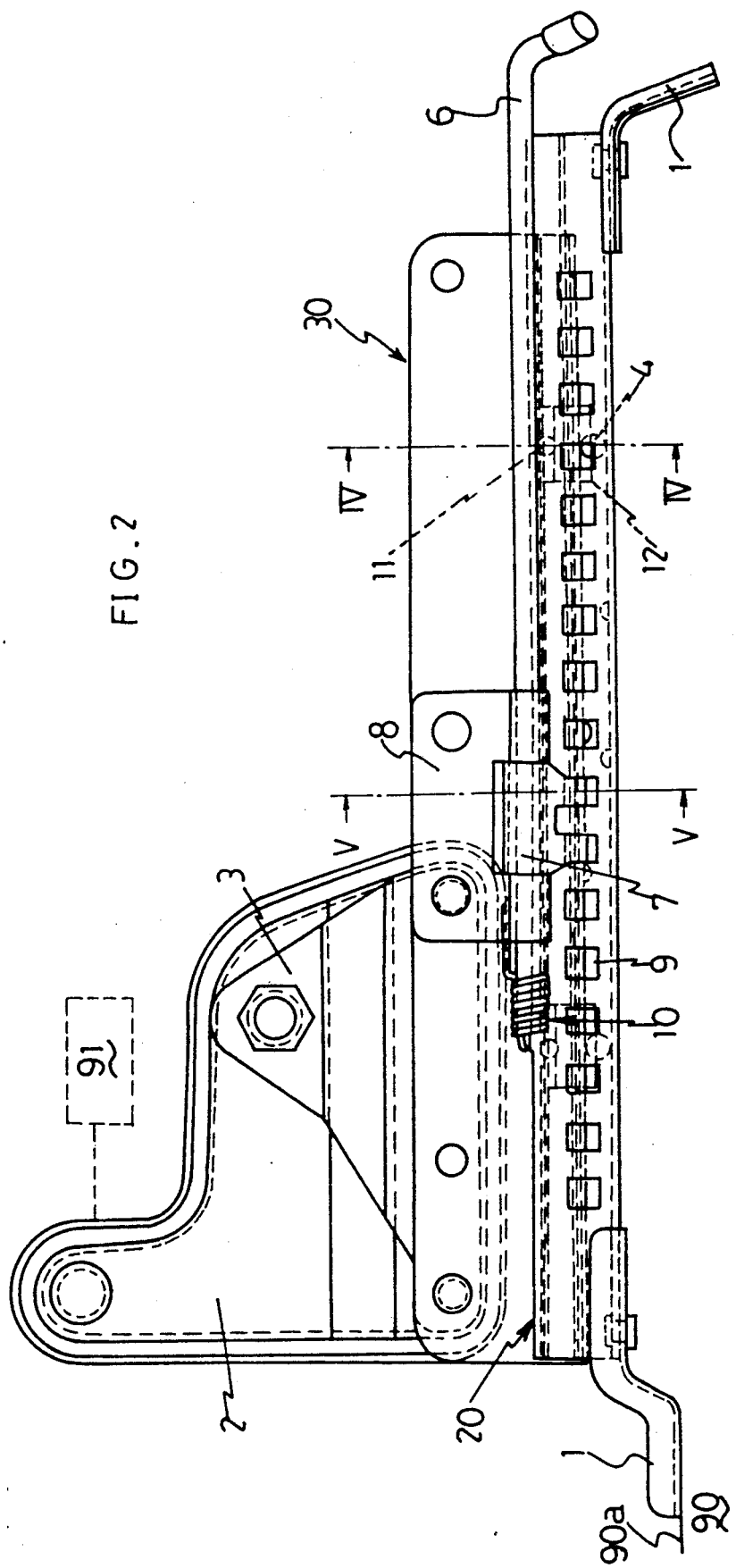
FIG. 2 is a side view of the device in FIG. 1.
Figure 3:
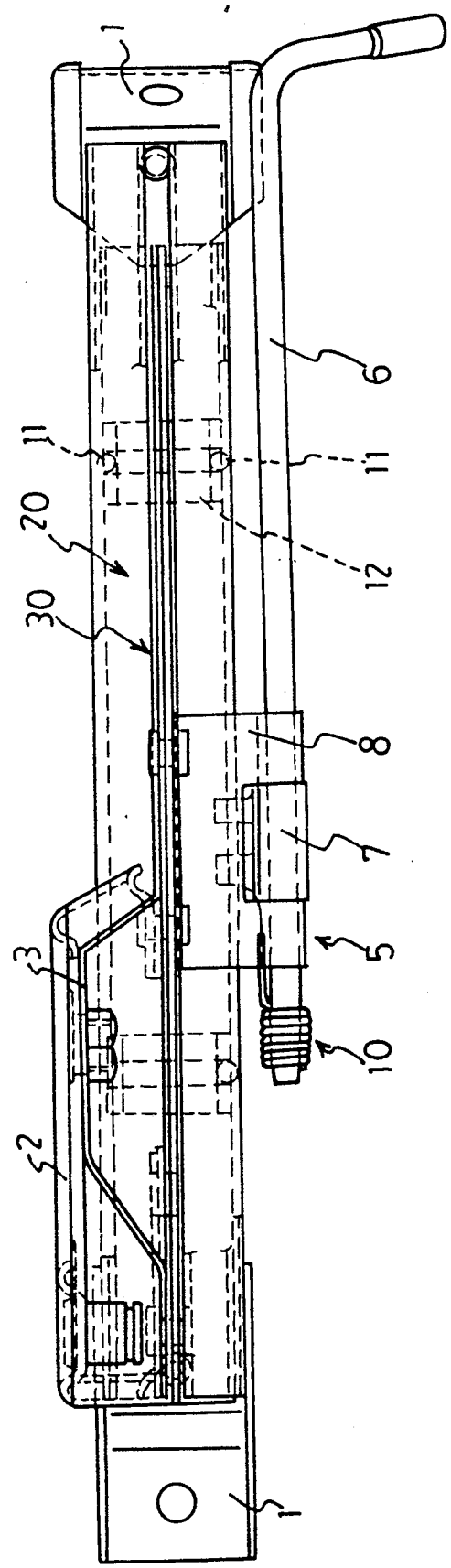
FIG. 3 is a top view of the device in FIG. 1.

Referring to FIGS. 1 through 3, a seat sliding device includes a pair of laterally spaced lower rails 20 (only one is shown). Each lower rail 20 is secured at its opposite end portions to a floor 90a of a vehicle body 90 via corresponding brackets 1. A pair of upper rails 30 (only one is shown) are slidingly mounted on the corresponding lower rails 20, and each upper rail 30 is secured to one side of a seat or a cushion 91 via a bracket 2. Seat 91 is well known, and therefore a detailed description is omitted. The upper rail 30 is also provided with a well known belt anchor (not shown) via the bracket 3. A roller 4 is disposed between the lower rail 20 and the upper rail 30 for enabling slidable movement of upper rail 30 on the lower rail 20. Positioning of the seat 91 in the longitudinal direction of the vehicle body 90 can thus be adjusted by sliding the upper rail 30 along the lower rail 20.

Between the lower rail 20 and the upper rail 30, there is interposed a lock means 5 for regulating the movement of the upper rail 30 along the lower rail 20. The lock means 5 has a bracket 8 which is secured to the upper rail 30. An operating handle 6 is rotatably mounted in the bracket 8 and is provided with a lock plate 7 which is engageable with a pair of adjacent holes 9 arranged in the lower rail 20. The operating handle 6 and the lock plate 7 are configured to rotate together. The lock plate 7 is continually urged toward holes 9 by a biasing force applied by a spring 10 disposed between the operating handle 6 and the bracket 8.

Upon rotation of the handle 6, rotation of the lock plate 7 against the biasing force of the spring 10 causes disengagement of the lock plate 7 and the two holes 9, thereby enabling the movement of the upper rail 30 relative to the lower rail 20. When the handle 6 is released after a desired transfer of the seat 91, the lock plate 7 is brought into engagement with the pair of holes 9 due to the biasing force of the spring 10. Thus, the position of the seat 91 is brought into an immovable or stationary condition.

Figure 4:
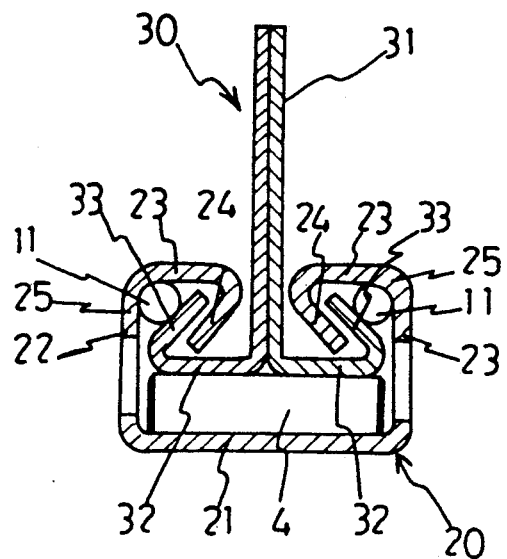
FIG. 4 is a cross-sectional view taken along line IV—IV in FIG. 2.
Figure 5:
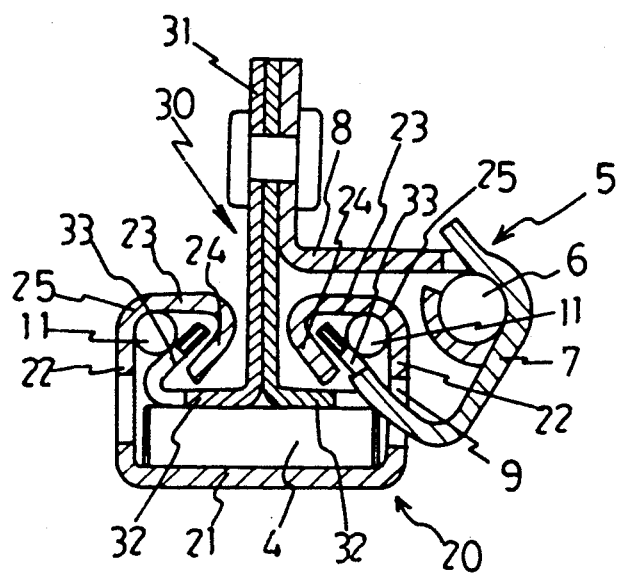
FIG. 5 is a cross-sectional view taken along line V—V in FIG. 2.

As best shown in FIGS. 4 and 5, the lower rail 20 includes a base portion 21, a pair of upstanding wall portions 22 extending integrally from opposite ends of the base portion 21, a pair of inner projected portions 23 each of which is in parallel relationship with the base portion 21 and a pair of downwardly inclined portions 24 each of which forms an acute angle with respect to the corresponding inner projected portion 23. The lower rail 20 with the foregoing configuration is made of sheet metal by bending the sheet metal in a well-known manner.

The upper rail 30 includes a pair of affixed vertical plates 31, a horizontal portion 32 projecting outwardly from each base plate 31 in parallel relationship with the base portion 21 of said lower rail, and an upwardly inclined portion 33 extending inwardly from a distal end of the horizontal portion 32, in parallel relationship with the downwardly inclined portion 24. The entire upwardly inclined portion 33, having a width of about 8 mm, overlaps with the entire downwardly inclined portion 24, which also has a width of about 8 mm. It should be noted that notwithstanding the foregoing widths of the inclined portions, the width of either the downwardly inclined portion 24, or the upwardly inclined portion 33, can be shortened so long as the inclined portions continue to interlock. The interlocking feature provides that the upwardly inclined portion 33 of the upper rail 30 and the downwardly inclined portion 24 of the lower rail 20 will continue to oppose each other, despite application of a strong force to the upper rail 30 via the belt-anchor as a result of vehicle collision. Thus, separation of the upper rail 30 from the lower rail 20 can be prevented despite movement of the upper rail 30, because of the larger area of engagement between the upper and lower rails, which was not the case with the conventional engagement.

As previously mentioned, the plurality of rollers 4 are interposed between the base portion 21 of the lower rail 20 and both horizontal portions 32 of the upper rail 30 for movement of the upper rail. In order to properly position the upper rail 30 relative to the lower rail 20, a plurality of spacing elements are used, for example balls 11, each of which is held by a bracket 12. The bracket 12 allows independent movement of each ball 11 from a corresponding roller 4. The ball 11 is positioned between the upwardly inclined portion 33 of the upper rail 30 and a corner defined by the intersection of the wall portion 22 and the inner projected portion 23 of the lower rail 20. Application of force to the upper rail 30 in the vertical direction results in a stronger engagement of the upwardly inclined portion 33 of the upper rail 30 with the corner 25 of the lower rail 20, due to the pressure applied to ball 11. Thus, the interlocking function between the upper rail 30 and the lower rail 20 can be increased.

It is further noted that each upwardly inclined portion 33 of the upper rail 30 moves upwardly upon upward movement of the upper rail. The resulting movement of the upwardly inclined portion 33 is prevented by the balls 11. In other words, the balls 11 act as a means for enhancing the interlocking function between the upper rail 30 and the lower rail 20. In addition, each corner 25 is formed having an arcuate configuration and radius for receiving the ball 11 smoothly.

Additional modifications and advantages will readily occur to one skilled in the art. The invention in its broader aspects is, therefore, not limited to the specific details and representative apparatus shown and described. Accordingly, departures may be made from such details without departing from the spirit or scope of the applicant's invention.

What is claimed is:

1. A seat sliding device comprising:
    a lower rail including a base portion having opposite ends for securing to a floor of a vehicle body, a pair of wall portions extending substantially perpendicularly from said opposite ends of said base portion, and a pair of upper portions projecting from respective wall portions parallel to said base portion and opposing one another, each said upper portion and wall portion defining a corner portion;
    an upper rail including means for securing said upper rail to a seat, the upper rail having a longitudinal portion disposed between said upper portions of said lower rail, a horizontal portion extending from said longitudinal portion in opposite directions substantially parallel to said base portion of said lower rail, and a pair of inclined portions projecting from said horizontal portion at an acute angle relative to said horizontal portion toward said longitudinal portion;
    roller means disposed between said base portion of said lower rail and said horizontal portion of said upper rail, for movement of said upper rail relative said lower rail; and
    a spacing element having a predetermined radius interposed between said inclined portion of said upper rail and said corner portion of said lower rail.

2. A seat sliding device according to claim 1, further including an inclined portion extending from each of said upper portions of said lower rail at an acute angle relative to said upper portion, generally parallel to said inclined portion of said upper rail.

3. A seat sliding device according to claim 2, wherein said inclined portions of said upper and lower rails have a predetermined width, said predetermined width of said upper rail inclined portion being substantially equal to said predetermined width of said lower rail inclined portion.

4. A seat sliding device according to claim 2, wherein said inclined portions of said upper and lower rails have a predetermined width, said predetermined width of said upper rail inclined portion being substantially larger than said predetermined width of said lower rail inclined portion.

5. A seat sliding device according to claim 1, wherein said corner portion of said lower rail includes an arcuate configuration having a radius substantially equal to the predetermined radius of the spacing element.

6. A seat sliding device according to claim 5, wherein said inclined portion of said upper rail is disposed to force the spacing element against said corner portion of said lower rail upon application of a force to said upper rail in a direction away from said lower rail.

7. A seat sliding device according to claim 1, wherein said spacing elements include balls.

8. A seat sliding device comprising:
    a lower rail including a base portion having opposite ends for securing to a floor of a vehicle body, a pair of wall portions extending substantially perpendicularly from said opposite ends of said base portion, and a pair of upper portions projecting from respective wall portions parallel to said base portion and opposing one another, each said upper portion and wall portion defining a corner portion;
    an upper rail including means for securing said upper rail to a seat, the upper rail having a longitudinal portion disposed between said upper portions of said lower rail, a horizontal portion extending from said longitudinal portion in opposite directions substantially parallel to said base portion of said lower rail, and a pair of inclined portions projecting from said horizontal portion at an acute angle relative to said horizontal portion toward said longitudinal portion;
    roller means disposed between said base portion of said lower rail and said horizontal portion of said upper rail, for movement of said upper rail relative to said lower rail; and
    interlocking means, including a spacing element interposed between said inclined portion of said upper rail and said corner portion of said lower rail, for causing said upper portion of said lower rail to deform into interlocking engagement with said inclined portion of said upper rail at times when an upward force is applied via said spacing element to said corner portion by said inclined portion of said upper rail.

* * * * *